(No Model.)
M. V. B. MORSE.
FEED TROUGH.
No. 493,040. Patented Mar. 7, 1893.
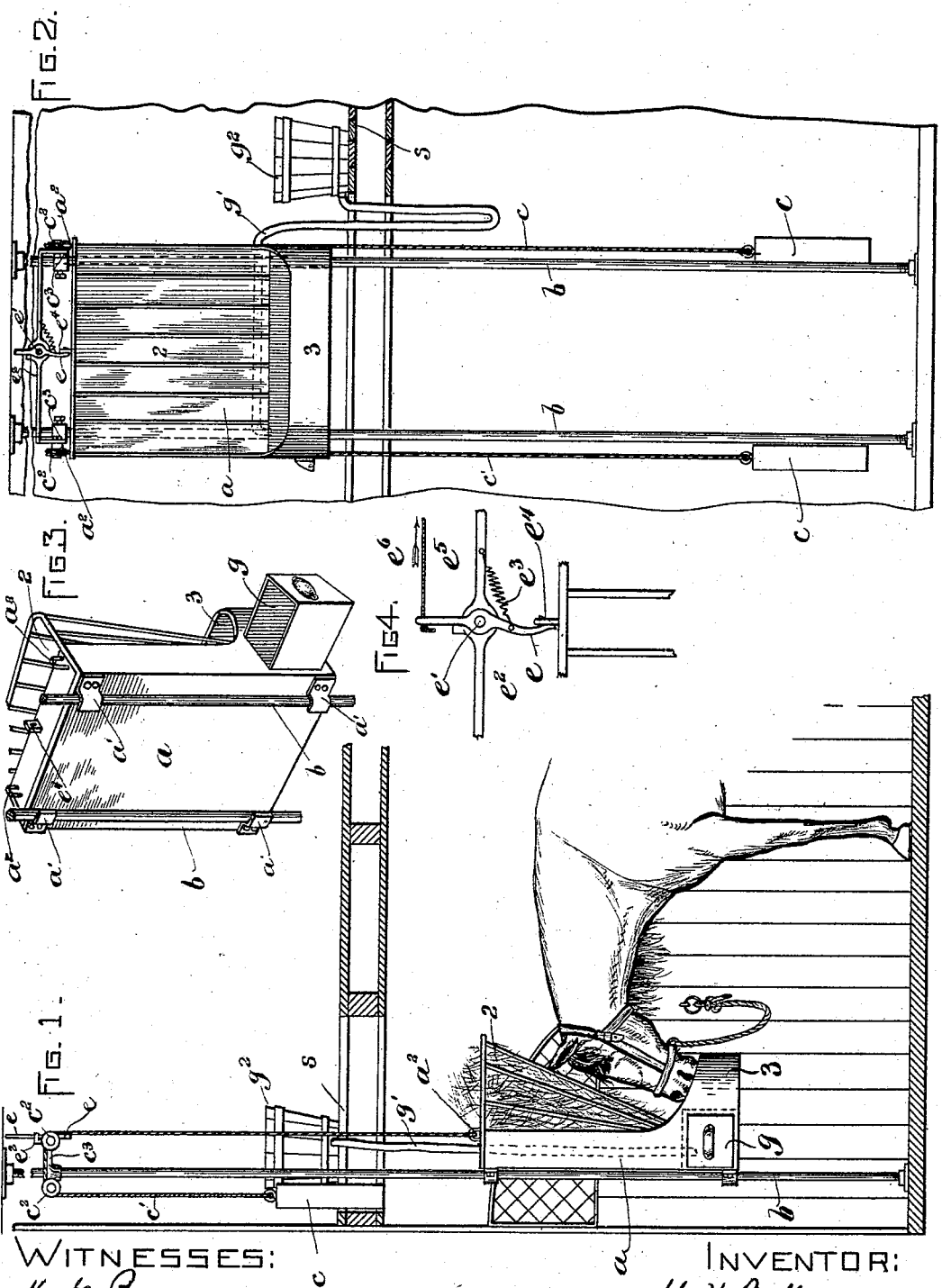
WITNESSES:
K. C. Brown.
A. D. Harrison.
INVENTOR:
M. V. B. Morse
by Wright Brown Crossley
Attys
THE NORRIS PETERS CO., PHOTO-LITHO., WASHINGTON, D. C.

UNITED STATES PATENT OFFICE.

MARTIN V. B. MORSE, OF MARBLEHEAD, MASSACHUSETTS.

FEED-TROUGH.

SPECIFICATION forming part of Letters Patent No. 493,040, dated March 7, 1893.

Application filed July 5, 1892. Serial No. 439,014. (No model.)

*To all whom it may concern:*

Be it known that I, MARTIN V. B. MORSE, of Marblehead, in the county of Essex and State of Massachusetts, have invented certain new and useful Improvements in Apparatus for Feeding Animals, of which the following is a specification.

This invention has for its object to provide an apparatus for feeding horses and other animals, adapted to be charged with fodder and supported in an elevated position out of the reach of the animal, and to be released either automatically or otherwise when it is desired to feed the animal.

The invention also has for its object to provide a vertically movable watering apparatus, which shall be automatically supplied with a charge of water when it falls from an elevated position to a position within reach of the animal.

To these ends, the invention consists in the improvements which I will now proceed to describe and claim.

Of the accompanying drawings, forming part of this specification: Figure 1 represents a side elevation of a feeding and watering apparatus embodying my invention, the receptacle being lowered within the reach of the animal. Fig. 2 represents a front elevation of the same, the receptacle being raised and out of the reach of the animal. Fig. 3 represents a perspective view of the receptacle. Fig. 4 represents an enlarged detail view.

The same letters and numerals of reference indicate the same parts in all the figures.

In the drawings: $a$ represents a sliding frame or receptacle, which, for horse-feeding purposes, is preferably composed of two compartments, viz., a rack 2 for the reception of hay, and a box 3 for the reception of grain, the grain-box being preferably below the rack, and the whole arrangement being preferably as shown in the drawings, although I do not limit myself to this arrangement, and may construct the holder or receptacle in any suitable way and provide it with any suitable number of compartments or feed-holders.

The holder $a$ is adapted to move vertically, and it is preferably connected with fixed vertical guides $b$ $b$, by means of ears or sockets $a'$ $a'$ affixed to the holder and adapted to slide upon said guides. A single guide may be employed, if desired, but I prefer to employ two guides, as shown in Figs. 2 and 3.

$c$ $c$ represent weights, which are attached to cords $c'$ $c'$, passing over pulleys $c^2$ $c^2$, which are mounted on fixed bearings, the cords $c'$ being attached to the holder $a$ by any suitable means, such as by eyes $a^2$ $a^2$ attached to the upper portion of the holder. The weights $c$ $c$ serve to partially counterbalance the weight of the holder $a$, when the latter is emptied, and thus enable the receptacle to be easily elevated to its raised position, shown in Fig. 2. The pulleys $c^2$ may be supported in any suitable manner. I have here shown them as journaled upon studs formed on arms $c^3$ affixed to the guide-rods $b$. The guide-rods $b$ are of sufficient height to enable the holder $a$ to be elevated, as shown in Fig. 2, to a point considerably above the animal's head, so that the contents of the holder will be out of reach of the animal.

$e$ represents a detent, which is pivoted at $e'$ to a suitable fixed support $e^2$, said support being in this case a bar affixed at its ends to the arms $c^3$. The detent $e$ is formed with a hook $e^3$, adapted to engage an eye or perforated lug $e^4$ affixed to the holder $a$, the arrangement being such that, when the holder is pushed upwardly to its raised position, the detent will automatically engage the eye $e^4$ and arrest the holder in its raised position, a spring $e^5$ being preferably provided to yieldingly hold the detent in engagement with the ear $e^4$. Any suitable means may be provided for displacing the detent $e$, and causing it to release the holder $a$, and said means may be automatic, if desired. In Fig. 4, I show a rod $e^6$, connected with the detent, and adapted, when moved in the direction indicated by the arrow, to cause the disengagement of the detent from the ear $e^4$. The rod $e^6$ may be moved in the direction indicated by an automatic motor, which is arranged to be let off at a predetermined time, or it may be moved by hand, the rod being extended to or connected with a suitable handle or pull, which may be located in another building at a distance from the stable in which my improved apparatus is located. It will be seen that, when the apparatus is raised and engaged with the detent, it may be loaded with fodder, and left in an elevated position until it is desired to feed the animal, the holder being then released by the disengagement of the detent from the ear $e^4$, whereupon the weight of the holder and its contents causes it to drop to the position shown in Fig. 1, so that the animal may obtain access to the fodder.

I prefer to provide the holder $a$ with a water receptacle $g$, which is here shown as a sliding tank, adapted to be pushed into and drawn out of the holder $a$. Said tank is here shown as connected by a flexible tube $g'$ with a water receptacle $g^2$, located on a support $s$, elevated above the stall, said support being arranged at such height that, when the holder $a$ is raised, the end of the tube $g'$ which enters the tank will be higher than the end of the tube connected with the receptacle $g^2$, so that water will not flow from the receptacle into the tank. When the holder $a$ is depressed, the tank, being then below the receptacle $g^2$, will receive water from the latter through the tube $g'$. The object of this arrangement is to prevent the holder $a$ from being too heavily weighted when it falls, the water being admitted to it only after its descent to the position shown in Fig. 1.

I do not limit myself to the details of mechanism herein shown and described, and may vary the same within the limits of mechanical skill and judgment to any desired extent, without departing from the spirit of my invention.

It will be seen that my improved apparatus enables a horse to be fed automatically at any predetermined time, so that the presence of an attendant may be dispensed with for a comparatively long period.

I claim—

1. In an animal-feeding apparatus, the combination of a vertically sliding fodder-holder, a detent which automatically engages the holder and holds it in an elevated position, and an operating device connected with, and extending from the detent to a distant point, so that the detent may be displaced and caused to release the holder by force exerted at a point remote from the apparatus, as set forth.

2. In an animal-feeding apparatus, the combination of a vertically movable fodder-holder, a fixed vertical guide on which said holder is movable, a counterbalancing weight connected with said holder, a detent which automatically engages the holder and holds it in an elevated position, and an operating device connected with, and extending from the detent to a distant point, whereby said detent may be displaced to release the holder, as set forth.

3. In an animal-feeding apparatus, the combination of a vertically sliding fodder-holder provided with a tank, means for detachably securing the holder and tank in an elevated position, and a water receptacle connected with said tank by a flexible pipe, said water receptacle being so located that the delivery end of the flexible pipe is above the receiving end when the fodder holder is raised, and below the receiving end when the fodder holder is lowered, as set forth.

4. In an animal-feeding apparatus, the combination of a vertically movable carriage, fixed guides on which said carriage is movable, elevated pulleys at the upper portions of the guides, cords connected with the carriage and passing upwardly therefrom over the pulley, counterbalancing weights connected with the cords, an elevated detent adapted to engage the carriage in its highest position, and an operating device for displacing the detent to release the carriage, as and for the purposes set forth.

5. In combination, a vertically movable carriage, a water receptacle supported by the carriage, a reservoir, a flexible connection between the reservoir and the water receptacle; counterbalancing weights connected with the carriage and a detent adapted to engage the carriage in its highest position, substantially as described.

6. The improved service carriage having in combination the main supporting frame $a$, reticulated partition 2 dividing the rear portion of the frame into a hay chamber, a grain chamber 3 formed by the lower portion of the frame, and a sliding tank $g$, all as and for the purposes set forth.

In testimony whereof I have signed my name to this specification, in the presence of two subscribing witnesses, this 30th day of June, A. D. 1892.

M. V. B. MORSE.

Witnesses:
C. F. BROWN,
A. D. HARRISON.